United States Patent
Kim

[11] Patent Number: 5,955,618
[45] Date of Patent: Sep. 21, 1999

[54] CIRCUIT FOR GENERATING FIELD IDENTIFICATION SIGNAL AND METHOD THEREFOR

[75] Inventor: Ki-bum Kim, Suwon, Rep. of Korea

[73] Assignee: Samsung Electronics Co., Ltd., Suwon, Rep. of Korea

[21] Appl. No.: 09/008,814

[22] Filed: Jan. 20, 1998

[30] Foreign Application Priority Data

Jan. 31, 1997 [KR] Rep. of Korea .................. 97-2987

[51] Int. Cl.$^6$ .................................................. H04N 7/00
[52] U.S. Cl. .......................... 548/471; 348/495; 348/526
[58] Field of Search .................... 348/558, 21, 526, 348/471, 495, 726, 725, 470, 469, 472, 500; 375/230, 232, 365, 368

[56] References Cited

U.S. PATENT DOCUMENTS 5,598,220  1/1997  Citta et al. .......................... 348/471

Primary Examiner—Victor R. Kostak
Attorney, Agent, or Firm—Staas & Halsey

[57] ABSTRACT

A field identification signal generating circuit for a receiver for receiving a high-definition signal, and a method therefor. According to the method, a first correlation value is calculated, between the high-definition signal and a first reference signal the same as a first known signal. A timing control signal, synchronized with a second known signal whose phase is alternately inverted in every field, is output when the first correlation value is greater than or equal to a predetermined value. A second correlation value is calculated, between the high-definition signal and a second reference signal the same as the second known signal. Information on the polarity of the second correlation value is output. A field identification signal is generated on the basis of the polarity information on the second correlation value which is synchronized with the timing control signal. Therefore, the field identification signal generating circuit can be realized with simple hardware.

46 Claims, 5 Drawing Sheets

FIG. 5F

CIRCUIT FOR GENERATING FIELD IDENTIFICATION SIGNAL AND METHOD THEREFOR

BACKGROUND OF THE INVENTION

1. Field of the Invention

The present invention relates to a receiver for receiving a high-definition signal, and more particularly, to a circuit and a method each for generating a field identification signal using a field synchronous signal.

2. Description of the Related Art

By virtue of research and development for achieving a large-sized and high-definition screen, Japan is carrying out the first high-definition television (HDTV) broadcasting on the basis of multiple subnyquist sampling encoding (MUSE) as a current analog transmission method. The U.S.A. has proposed a grand alliance (GA)-HDTV system, and for this, has adopted a vestigial side band (VSB) modulation method, being a digital transmission method. The GA-HDTV uses an 8-VSB using 8 levels, for a terrestrial broadcast mode, and a 16-VSB using 16 levels, for a high speed cable mode.

Figure 1:
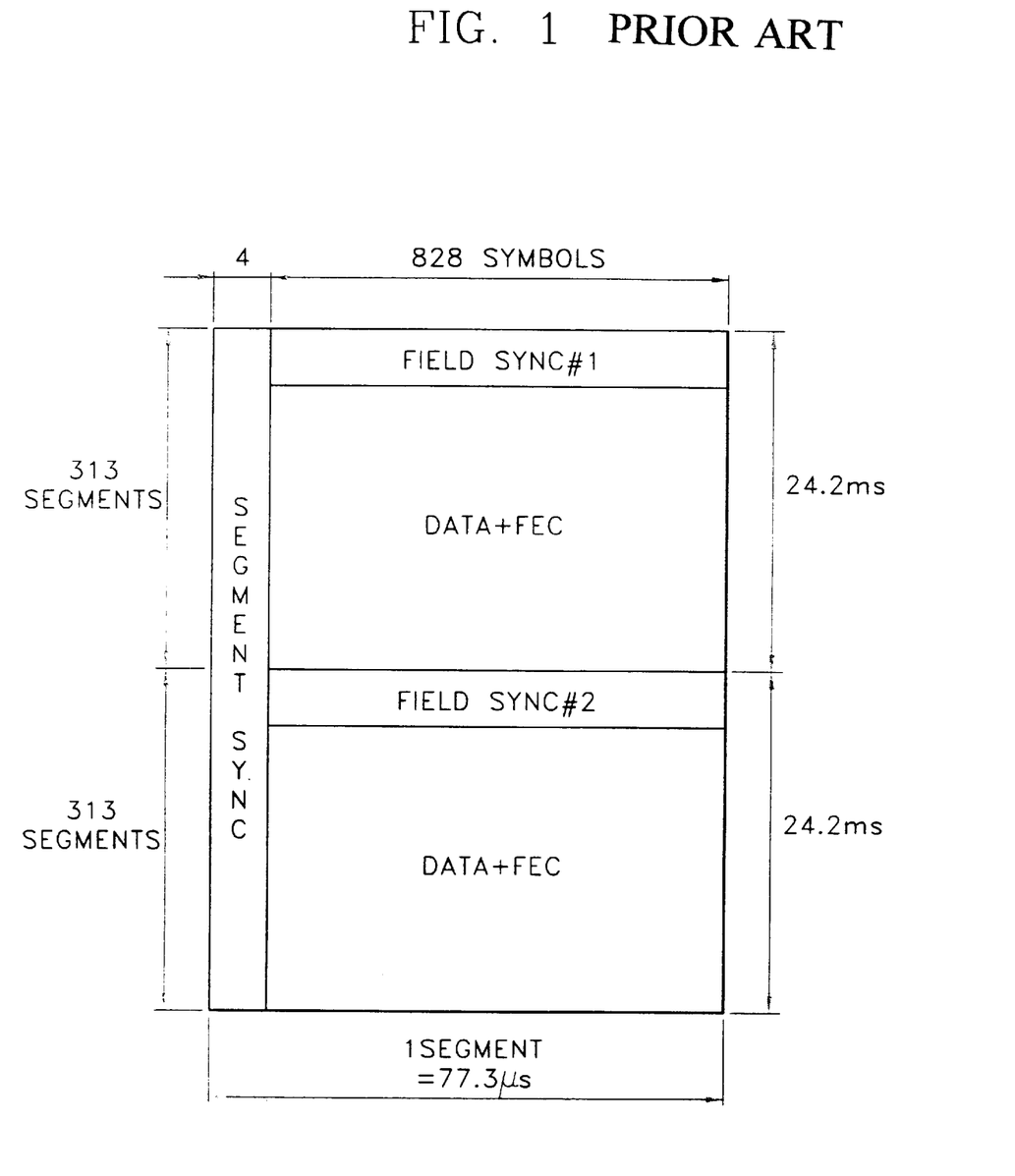
FIG. 1 shows a VSB data frame format of a GA-HDTV.

FIG. 1 shows a VSB data frame format of the GA-HDTV. The VSB data frame is comprised of two fields each comprised of a field synchronous segment and 312 data segments. Each data segment is comprised of 4 segment synchronous symbols and 828 data symbols. The segment synchronous symbols are inserted into an 8-level digital data stream at the head of the field synchronous segment and each of the data segments. The respective 4 segment synchronous symbols are formed in a constant pattern having a signal level of "+5, −5, −5, +5", and the remaining data of each data segment are randomly formed having an arbitrary signal level among the 8 levels (±1, ±3, ±5, ±7).

Figure 2:
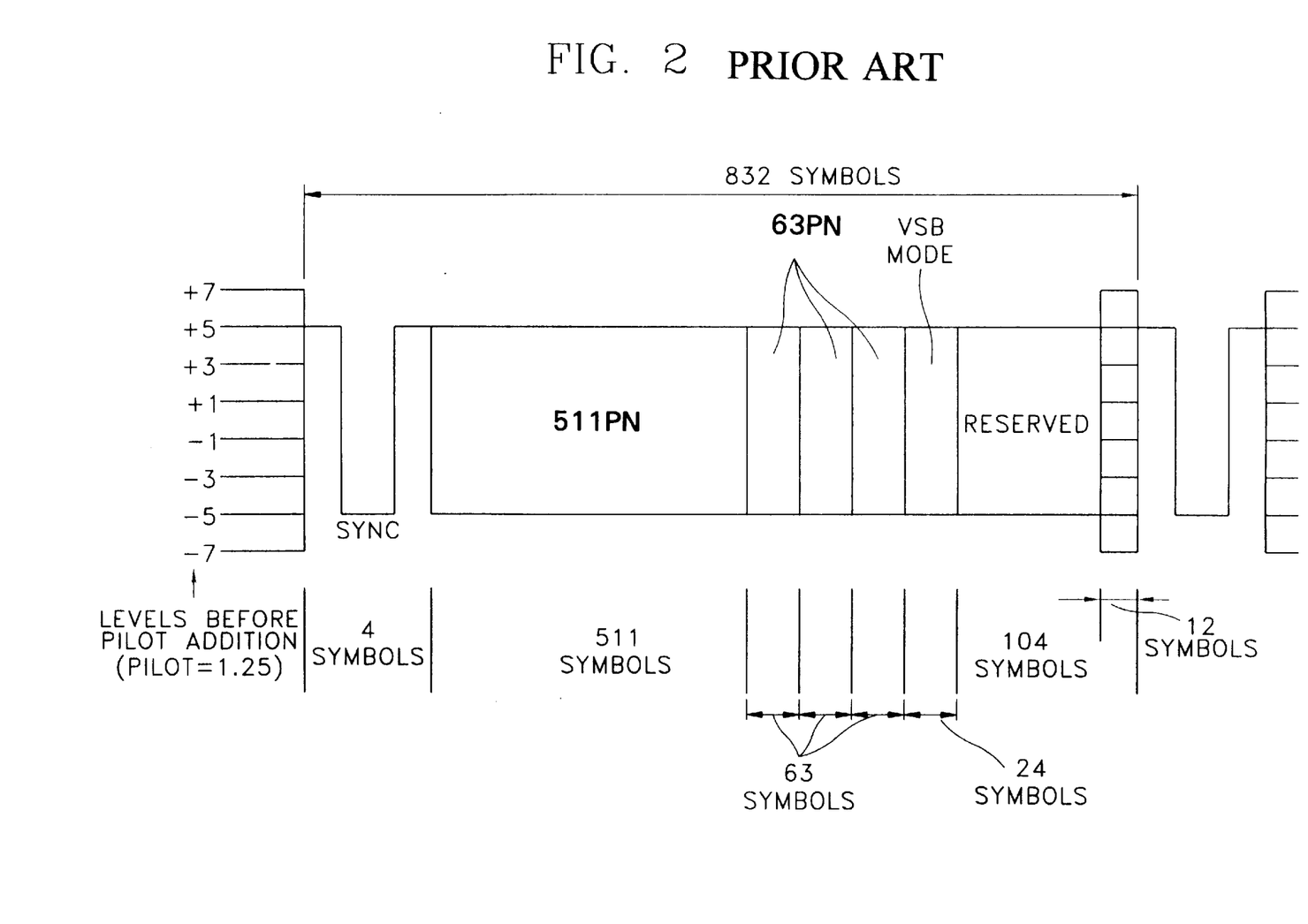
FIG. 2 shows a VSB data field synchronous signal.

Meanwhile, each field synchronous signal sequence (FIELD SYNC #1 and FIELD SYNC #2), for representing the start of each field, is inserted into the field synchronous segment corresponding to the first segment for each field. FIG. 2 shows the format of a VSB data field synchronous signal. Referring to FIG. 2, the field synchronous segment is comprised of 832 symbols. The first four symbols among them are segment synchronous symbols. A 511 pseudo number (PN) comprises the next 511 symbols, and three PNs each of 63 symbols comprise the following 189 symbols, and the other information comprises the remaining 128 symbols. Here, the PN511 has a predetermined signal sequence which is represented by levels +5 and −5, so that it is used in a signal processing block using a known signal sequence, such as an equalization. The second 63PN of the three 63PNs has a phase which is inverted in every alternate field. In this way, a field synchronous signal sequence indicating the start of each field having a format shown in FIG. 2, is inserted into a first segment in each field, and the field synchronous signal sequence is a known signal sequence having a constant form.

Accordingly, a synchronous signal must be detected by a receiver, to reproduce a transmitted VSB signal having the same structure as that of FIG. 1. Furthermore, the receiver must determine whether a field is an odd or even field, for correct reproduction to be possible. In particular, an equalizer and an error correction decoder in a receiver, necessarily require a field identification signal in order to accomplish a correct signal processing.

Meanwhile, circuits for generating a field identification signal applied in an analog television have been proposed. However, since the GA-HDTV has a different signal format to analog television, and processes entire signals digitally, it was impossible to apply the field identification signal generating circuit for the conventional analog television to the GA-HDTV without making changes.

SUMMARY OF THE INVENTION

Accordingly, it is an object of the present invention to provide a circuit for generating a field identification signal by detecting the polarity of a known signal whose polarity is alternately inverted in every field, included in a field synchronous signal sequence of a transmitted high-definition signal, in a high-definition signal receiver.

It is another object of the present invention to provide a method for generating a field identification signal by detecting the polarity of a known signal, whose polarity is alternately inverted in every field, included in a field synchronous signal sequence of a transmitted high-definition signal.

Additional objects and advantages of the invention will be set forth in part in the description which follows, and, in part, will be obvious from the description, or may be learned by practice of the invention.

To accomplish the first object, there is provided, in a receiver for receiving a high-definition (HD) signal including a first known signal and a second known signal whose phase is inverted in every alternate field, a circuit for generating a field identification signal comprising: first detecting means for detecting a first correlation value representing the correlation between the input HD signal and a first reference signal the same as the first known signal, and for outputting a timing control signal, synchronized with the second known signal, when the first correlation value is greater than or equal to a predetermined value; second detecting means for detecting a second correlation value representing the correlation between the input HD signal and a second reference signal the same as the second known signal, and for outputting information on a polarity of the second correlation value; and generating means for generating a field identification signal on the basis of the information on the polarity of the second correlation value synchronized with the timing control signal.

To accomplish the second object, there is provided, in a method of generating a field identification signal using a high-definition signal including a first known signal and a second known signal whose phase is inverted in every alternate field, a field identification signal generating method comprising the steps of: detecting a first correlation value representing a correlation between the high-definition signal and a first reference signal the same as the first known signal, and outputting a timing control signal synchronized with the second known signal, when the first correlation value is greater than or equal to a predetermined value; detecting a second correlation value representing the correlation between the high-definition signal and a second reference signal the same as the second known signal, and outputting only information on the polarity of the second correlation value; and generating a field identification signal on the basis of the information on a polarity of the second correlation value which is synchronized with the timing control signal.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Hereinbelow, a preferred embodiment of the present invention will be described in detail with reference to the accompanying drawings.

Figure 3:
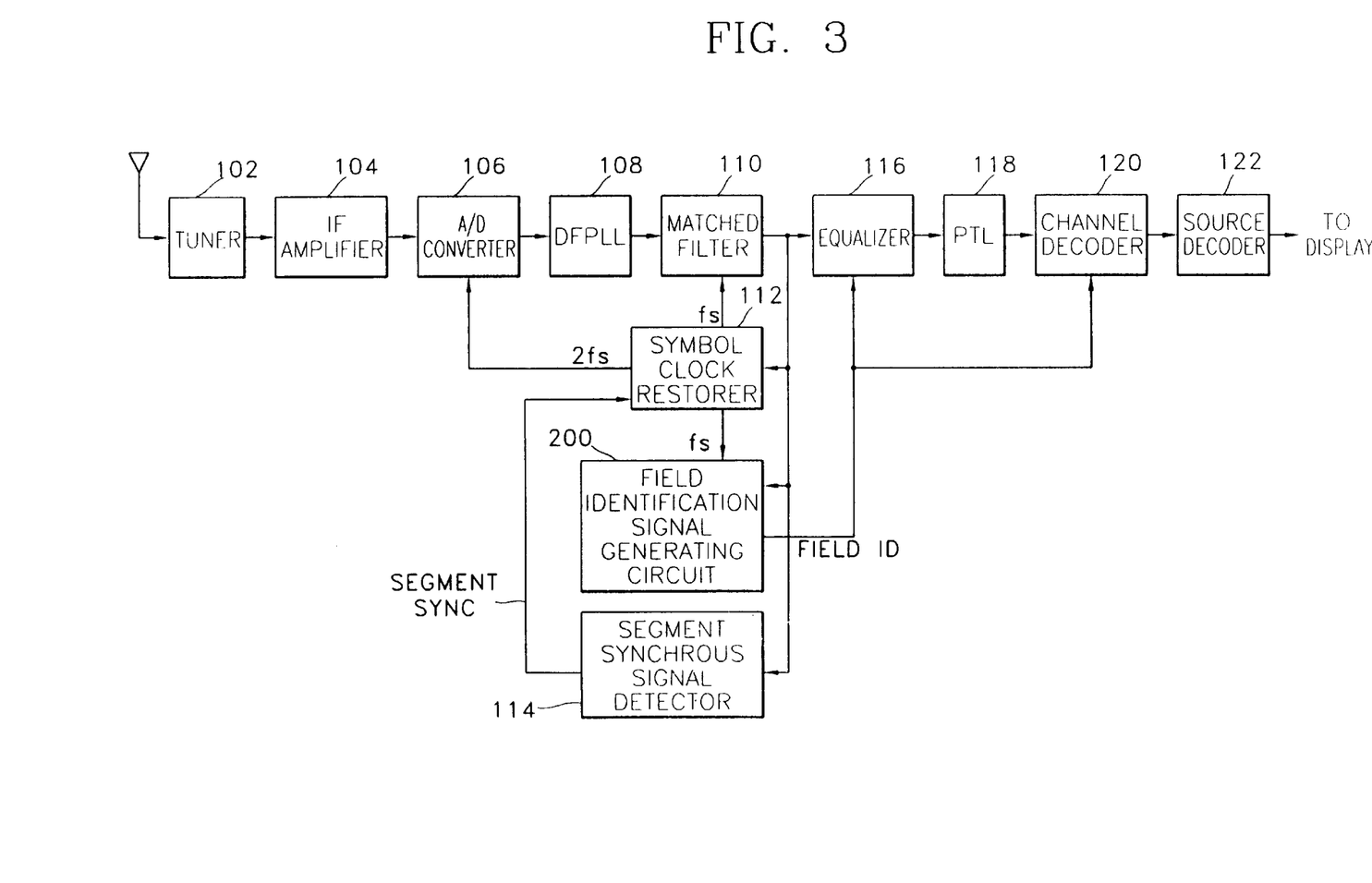
FIG. 3 is a block diagram of an HDTV receiver to which the present invention is applied.

Referring to FIG. 3, a tuner 102 converts a VSB signal, picked up by an antenna, into an intermediate frequency (IF) signal of a predetermined frequency. An IF amplifier 104 controls the amplitude of the IF signal according to an automatic gain control signal (not shown), so that a signal input to an analog/digital (A/D) converter 106 can maintain a constant level.

The A/D converter 106 converts the analog IF signal output by the IF amplifier 104 into a digital signal, according to a clock signal having a frequency (2 fs) of twice a symbol clock frequency (fs). The symbol clock frequency is provided by a symbol clock restorer 112. A digital frequency and phase locked loop (DFPLL) circuit 108 restores a carrier wave using a pilot signal included in data output by the A/D converter 106, multiplies the restored carrier wave by the output data of the A/D converter 106, and restores the result to base band data.

A matched filter 110 removes signal distortion and aliasing by matching the demodulated base band signal to the original signal before it was transmitted, and controls the symbol rate of data output by the DFPLL circuit 108. The matched filter 110 adjusts the symbol rate of the output of the DFPLL circuit 108 as the symbol clock frequency (fs). Here, the symbol rate of data output by the DFPLL circuit 108 is twice the symbol clock frequency.

The symbol clock restorer 112 restores a symbol clock, in response to the output of the matched filter 110 and a segment synchronous signal output by a segment synchronous signal detector 114, and applies a sampling clock having a frequency (2 fs) of twice that of the symbol clock to the A/D converter 106. The symbol clock frequency (fs), restored by the symbol clock restorer 112, can be provided not only to the matched filter 110 and a field identification signal generating circuit 200, but also to other blocks (not shown) for digital signal processing.

The segment synchronous signal detector 114 receives data at the symbol rate of fs controlled by the matched filter 110, calculates a correlation value in a unit of four symbols, accumulates the obtained correlation value in a segment unit, and generates a segment synchronous signal at a position where an accumulated value of maximum correlation is detected in each data segment, since the accumulated correlation value of the corresponding segment is at a maximum during a four segment synchronous symbol section.

A field identification signal generating circuit 200 generates a field identification signal, using the fact that the polarity of the second 63PN signal, among the three 63PN signals included in a field synchronous signal sequence existing in a first segment of each field, is alternately inverted in every field. The field identification signal is input to an equalizer 116 and a channel decoder 120 and used for an equalization process and an error-correction decoding process.

The equalizer 116 removes multipath distortion generated during transmission of the transmission signal. In a terrestrial broadcasting, multipath distortion is caused by propagation reflection from mountains, building groups, airplanes, etc. Accordingly, the equalizer 116 performs an equalization by renewing coefficients of a filter provided within the equalizer 116, using a known signal sequence (here, a 511PN signal: a training sequence is called) inserted into a field synchronous segment. Also, the equalizer 116 outputs data having an arbitrary level among 8 levels, during the coefficients renewal, which makes a high speed tracking of a moving ghost possible. A phase tracking loop (PTL) circuit 118 removes a phase noise which was not removed by the DFPLL circuit 108, i.e., a phase error. When the equalizer 116 performs an equalization for each field, i.e., equalizes the coefficients in the corresponding field using a known signal sequence which is included in a field synchronous signal sequence of each field segment, then a field identification signal for identifying whether a field is an odd or even field is necessarily required.

Meanwhile, before the signal is transmitted from the transmitter, it is error-correction encoded with a Reed-Solomon (RS) code in order to reduce symbol errors generated during transmission. The error-correction encoded data is interleaved, and the interleaved data is modulated using a trellis coded modulation (TCM) encoding and then randomized. A block for decoding the result is a channel decoder 120. The channel decoder 120 trellis-decodes the output of the PTL circuit 118, de-interleaves the trellis decoded data, error-correction decodes the de-interleaved data, and then de-randomizes the result. Here, a field identification signal is also required to perform the de-interleaving and de-randomization processes in a field. Therefore, a field identification signal generated by the field identification signal generating circuit 200 is used.

A source decoder 122 variable-length decodes the error-correction decoded data output by the channel decoder 120, inverse-quantizes the variable-length decoded data, restores the inverse-quantized data to the original data through an orthogonal transform, and then outputs the result on a display.

Figure 4:
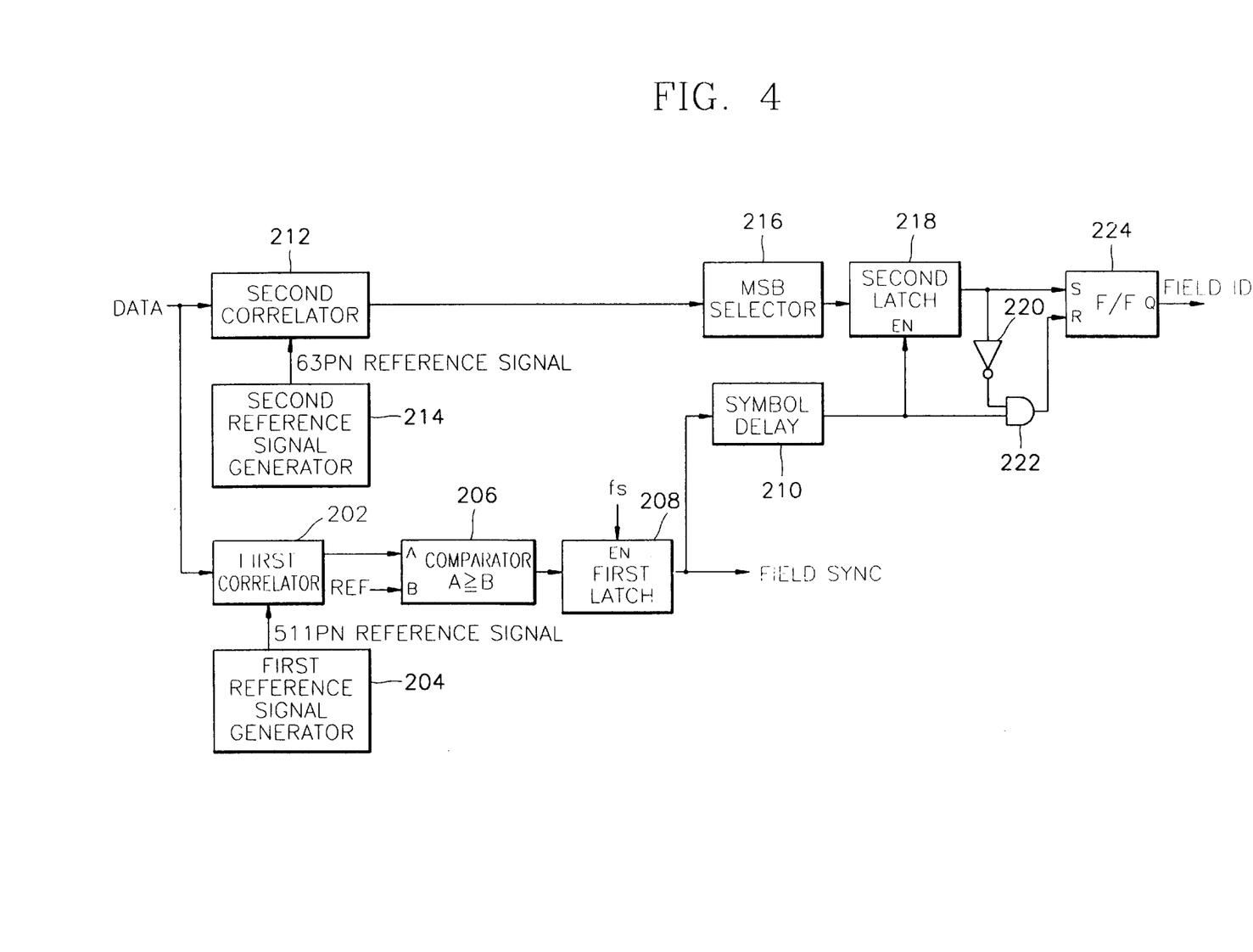
FIG. 4 is a circuit diagram of a field identification signal generating circuit according to an embodiment of the present invention.

FIG. 4 is a detailed circuit diagram of the field identification signal generating circuit 200 shown in FIG. 3. Referring to FIG. 4, VSB data is applied from the matched filter 110 of FIG. 3 to the first input of a first correlator 202. The second input of the first correlator 202 is connected to the output of a first reference signal generator 204. The first input (A) of a comparator 206 is connected to the output of the first correlator 202, the second input (B) thereof is connected to a predetermined reference value (REF), and the output thereof is connected to the input of a first latch 208. The symbol clock frequency (fs), from the symbol clock restorer 112 of FIG. 3, is applied to the enable input (EN) of the first latch 208. The output of the first latch 208 is connected to the input of a symbol delay 210.

The VSB data is applied from the matched filter 110 to the first input of a second correlator 212. The second input of the second correlator 212 is connected to the output of a second reference signal generator 214. The output of the second correlator 212 is connected to the input of a most significant bit (MSB) selector 216.

The input of a second latch 218 is connected to the output of the MSB selector 216. The enable input (EN) of the second latch 218 is connected to the output of the symbol delay 210. The output of the second latch 218 is connected to both a set input (S) of a set-reset flip-flop (S-R F/F) 224 and to the input of an inverter 220. The first input of an AND gate 222 is connected to the output of the inverter 220, the second input thereof is connected to the output of the symbol delay 210, and the output thereof is connected to a reset input (R) of the S-R F/F 224. A field identification signal (FIELD ID) is output from the output (Q) of the S-R F/F 224. Here, the inverter 220 and the AND gate 222 can be replaced by an exclusive OR gate. Also, in order to simplify the hardware of the first and second correlators 202 and 212, the MSB selector can be provided before the first and second correlators 202 and 212.

Operation of the circuit shown in FIG. 4 will now be described. The VSB data as shown in FIG. 1 is input to the first inputs of both the first and second correlators 202 and 212. The first reference signal generator 204 generates a pseudo random number having a reference signal of 511 symbols length (511PN reference signal). Here, the 511PN reference signal is called a first reference signal. That is, the same signal as the 511PN included in the field synchronous signal sequence as shown in FIG. 2 is generated. The second reference signal generator 214 generates a pseudo random number having a reference signal of 63 symbols length (63PN reference signal). Here, the 63PN reference signal is called a second reference signal. That is, the same signal as the 63PN included in the field synchronous signal sequence as shown in FIG. 2 is generated. The 511PN and 63PN reference signals, generated by the first and second reference signal generators 204 and 214, are applied to the second inputs of the first and second correlators 202 and 212, respectively.

Figure 5A:
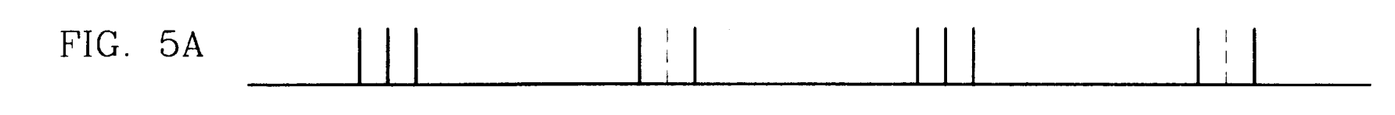
FIGS. 5A through 5F show the waveforms of the circuit shown in FIG. 4.

Accordingly, the second correlator 212 calculates a 63PN correlation value by accumulating a value representing the correlation between the VSB data and the 63PN reference signal, in units of 63 symbols, thereby outputting three 63PN correlation peak values with respect to 63PN in every field as shown in FIG. 5A. Alternation of solid and dotted lines for the middle of the three correlation peak values shown in FIG. 5A indicates that the polarity of the correlation peak value is alternately inverted from positive to negative in field units, or vice-versa. The above phenomenon occurs because, as described above, the phase of the second 63PN, of the three 63PNs included in the field synchronous signal sequence, is alternately inverted in every field according to the VSB frame format.

Figure 5B:
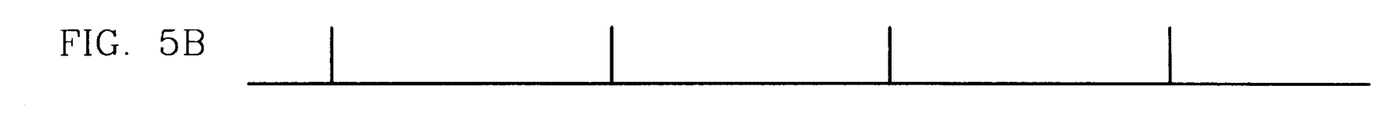

Also, the first correlator 202 obtains a 511PN correlation value by accumulating a value representing the correlation between the VSB data and the 511PN reference signal in units of 511 symbols, thereby outputting a correlation peak value with respect to 511PN in every field as shown in FIG. 5B. The peaks shown in FIGS. 5A and 5B are generated only at the time when the 511PN and 63PN signals of the field synchronous signal sequence occur, and are represented as values being almost zero except in the field synchronous signal. Here, in order to simplify the hardware, the first and second correlators 202 and 212 receive only a sign bit of VSB data received, and can detect the 63PN and 511PN correlation values, respectively.

Meanwhile, the output of the first correlator 202 is input to the first input (A) of the comparator 206. The comparator 206 compares the output of the first correlator 202 with a reference value (REF) input through the second input (B), and outputs a logic "high" signal only when the output of the first correlator 202 is greater than or equal to the reference value (REF). That is, when input data is a 511PN synchronous signal sequence, it uses the fact that the correlation value obtained by the first correlator 202 is at a maximum.

The output signal of the comparator 206 is latched by the first latch 208 according to a symbol clock frequency (fs), and the output of the first latch 208 is output as a field synchronous signal (FIELD SYNC) and simultaneously applied to the symbol delay 210. In addition, when a very large noise, ghost, interference, etc., is included in the transmitted signal, the correlation between the 63PN signal and the 63PN reference signal is small. However, since the 511PN correlation value is about eight times greater than the 63PN correlation value, a field synchronous signal is detected using the 511PN correlation value. Here, strictly speaking, the field synchronous signal output by the first latch 208 is a field synchronous timing signal.

Figure 5C:
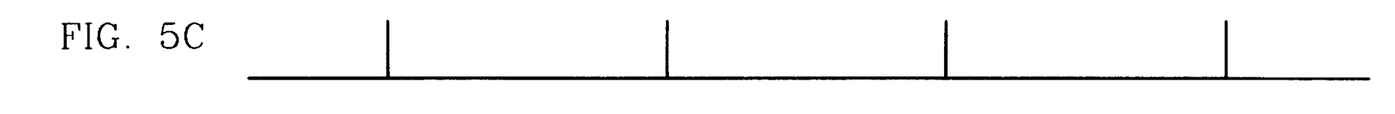

The symbol delay 210 delays by 126 symbols the 511PN correlation value latched by the first latch 208 and outputs the delayed 511PN correlation value as shown in FIG. 5C. That is, the 511PN correlation value of the waveform (FIG. 5C), output by the symbol delay 210, coincides with the middle of the three 63PN correlation values.

Meanwhile, the MSB selector 216 selects only the MSB of the output of the second correlator 212, and outputs the result to the second latch 218. This occurs because the present invention requires only information on the polarity of the three 63PN signals in the output of the second correlator 212 in order to generate a field identification signal by detecting the polarity of the second of the three 63PN signals. Here, the VSB data is 2's complement data.

Figure 5D:
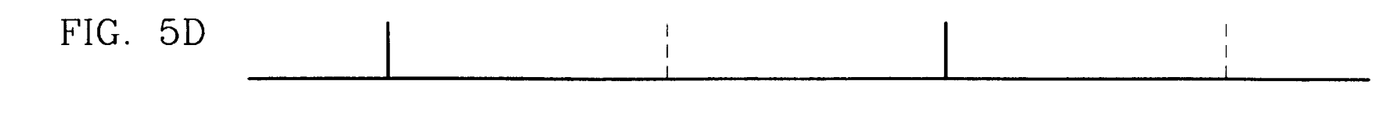
Figure 5E:
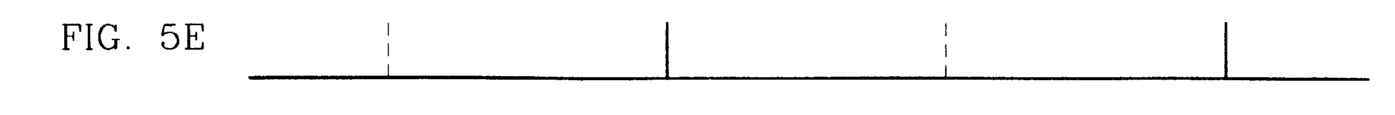

The second latch 218 latches the MSB of the 63PN correlation value output by the MSB selector 216, according to the output signal of the symbol delay 210, and outputs only the middle of the three 63PN correlation values which are generated in every field, as shown in FIG. 5D. The output signal of the second latch 218 is input to the inverter 220 and simultaneously to the set input (S) of the S-R F/F 224. The output signal of the second latch 218, inverted by the inverter 220, is input to the first input of the AND gate 222, and the output signal of the symbol delay 210 is input to the second input of the AND gate 222. A signal having a waveform shown in FIG. 5E is output by the AND gate 222 and input to the reset input (R) of the S-R F/F 224. Here, the waveform shown in FIG. 5E has the form of the waveform of FIG. 5D, but with the positive and negative parts exchanged. In the end, the timing of the waveform of FIG. 5D agrees with when the second 63PN signal is positive, and the timing of the waveform of FIG. 5E agrees with when the second 63PN signal is negative.

Figure 5F:
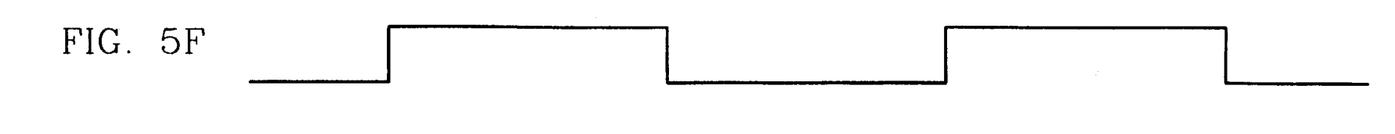

The output signals (FIG. 5D and FIG. 5E) of the second latch 218 and the AND gate 222, respectively, control the setting and resetting of the S-R F/F 224. Accordingly, logic "high" and "low" field identification signals (FIELD ID), having the waveform shown in FIG. 5F, for identifying an odd field and an even field, are alternately generated at the output of the S-R F/F 224, in every field.

As described above, in a receiver for receiving a high-definition signal, a field identifying signal for correctly identifying an odd field and an even field is generated using a 63PN signal whose phase is alternately inverted in every field. An appropriate field identifying signal is provided to a waveform equalizer or a channel decoder of the receiver, thereby facilitating signal processing. Furthermore, the structure of the present invention is very simple, so it is very effective for hardware realization.

What is claimed is:

1. A circuit for generating a field identification signal in a receiver for receiving a high-definition (HD) signal including a first known signal and a second known signal whose phase is inverted in every alternate field, the circuit comprising:

first detecting means for detecting a first correlation value representing a correlation between said HD signal and a first reference signal same as said first known signal, and for outputting a timing control signal, synchronized with said second known signal, when said first correlation value is at least as great as a predetermined value;

second detecting means for detecting a second correlation value representing a correlation between said HD signal and a second reference signal same as said second known signal, and for outputting information on a polarity of said second correlation value; and generating means for generating a field identification signal based upon said information on the polarity of said second correlation value and synchronized with said timing control signal.

2. The circuit for generating a field identification signal according to claim 1, wherein said first detecting means comprises:

a first correlator to calculate the correlation between said HD signal and said first reference signal, and output said first correlation value; and a comparator to compare said first correlation value with a predetermined reference value, and to output a comparison signal as a field synchronous signal when said first correlation value is at least as great as said predetermined reference value.

3. The field identification signal generating circuit according to claim 1, wherein said second detecting means comprises:

a second correlator to calculate the correlation between said HD signal and said second reference signal, and output said second correlation value; and a sign bit selector for selecting only a sign bit of said second correlation value.

4. A field identification signal generating circuit in a receiver for receiving a high-definition (HD) signal wherein one frame comprises two fields, each field comprises a field synchronous segment and data segments, each field synchronous segment includes a first synchronous signal and three second synchronous signals, and a phase of one of said three second synchronous signals is inverted in every alternate field, the field identification signal generating circuit comprising:

first correlating means for obtaining a first correlation value representing a correlation between said HD signal and a first reference signal same as said first synchronous signal;

second correlating means for obtaining a second correlation value representing a correlation between said HD signal and a second reference signal same as said second synchronous signal;

first generating means for generating a first timing signal synchronized with said second synchronous signal which has the inverting phase, by delaying said first correlation value by a predetermined number of symbols;

second generating means for latching said second correlation value according to said first timing signal and generating a second timing signal synchronized with when said second synchronous signal having the inverting phase is positive;

third generating means for performing logical operations on said first and second timing signals to generate a third timing signal synchronized with when said second synchronous signal having the inverting phase is negative; and fourth generating means for generating a field identification signal representing odd and even fields, based on said second and third timing signals.

5. The field identification signal generating circuit according to claim 4, wherein said first correlating means selects only a sign bit of said HD signal to obtain said first correlation value.

6. The field identification signal generating circuit according to claim 4, wherein said second correlating means selects only a sign bit of said HD signal and outputs only a sign bit of said second correlation value, to obtain said second correlation value.

7. A field identification signal generating circuit in a receiver for receiving a high-definition television (HDTV) signal wherein one frame comprises two fields, each field comprises a field synchronous segment and data segments, each field synchronous segment includes a first synchronous signal and three second synchronous signals, and a phase of one of the three second synchronous signals is inverted in every alternate field, the field identification signal generating circuit comprising:

a first reference signal generator to generate a first reference signal same as said first synchronous signal;

a first correlator to obtain a first correlation value representing a correlation between said HDTV signal and said first reference signal;

a second reference signal generator to generate a second reference signal same as said second synchronous signal;

a second correlator to obtain a second correlation value representing a correlation between said HDTV signal and said second reference signal;

a comparator to compare said first correlation value with a predetermined reference value, and to output a comparison signal when said first correlation value is at least as great as said reference value;

a symbol delay to delay said comparison signal by a predetermined number of symbols, and to output a first timing signal synchronized with said second synchronous signal having the inverting phase;

a sign bit selector to select only a sign bit from said second correlation value;

a latch to latch said sign bit according to said first timing signal, and to output a second timing signal synchronized with when said second synchronous signal having the inverting phase is positive;

a logic circuit to perform a logic operation on the outputs of said latch and said symbol delay, and for generating a third timing signal which is synchronized with when said second synchronous signal having the inverting phase is negative; and generating means for receiving the output of said latch, as a set signal, and the output of said logic circuit, as a reset signal, and for generating a field identification signal.

8. The field identification signal generating circuit according to claim 7, further comprising:

a first sign bit selector for selecting only a sign bit of said HDTV signal and outputting the result to said first correlator; and a second sign bit selector for selecting only a sign bit of said HDTV signal and outputting the result to said second correlator.

9. The field identification signal generating circuit according to claim 8, wherein said first correlator detects the correlation between a sign bit of a 511 pseudo number (PN) signal inserted into a field synchronous signal sequence of said HDTV signal, and a 511PN reference signal.

10. The field identification signal generating circuit according to claim 8, wherein said second correlator detects the correlation between a sign bit of a 63PN signal inserted into a field synchronous signal sequence of said HDTV signal, and a 63PN reference signal.

11. The field identification signal generating circuit according to claim 7, wherein said logic circuit comprises:
   an inverter to invert the output of said latch; and
   an AND gate for performing an AND operation on the outputs of said inverter and said symbol delay.

12. The field identification signal generating circuit according to claim 7, wherein said logic circuit comprises an exclusive OR gate for performing an exclusive OR operation on the outputs of said latch and said symbol delay.

13. The field identification signal generating circuit according to claim 7, further comprising a second latch to latch said comparison signal according to a symbol clock frequency and apply said latched signal to said symbol delay and simultaneously output the latched signal as a field synchronous signal.

14. A method of generating a field identification signal using a high-definition signal including a first known signal and a second known signal whose phase is inverted in every alternate field, the method comprising the steps of:
   (a) detecting a first correlation value representing a correlation between said high-definition signal and a first reference signal same as said first known signal, and outputting a timing control signal synchronized with said second known signal, when said first correlation value is at least as great as a predetermined value;
   (b) detecting a second correlation value representing a correlation between said high-definition signal and a second reference signal same as said second known signal, and outputting only information on a polarity of said second correlation value; and
   (c) generating a field identification signal based upon said information on the polarity of said second correlation value and which is synchronized with said timing control signal.

15. A method of generating a field identification signal, by receiving a high definition television (HDTV) signal wherein one frame comprises two fields, each field comprises field synchronous segments and data segments, each field synchronous segment includes a first synchronous signal and three second synchronous signals, and a phase of one of said three second synchronous signals is inverted in every alternate field, the method comprising the steps of:
   (a) obtaining a first correlation value representing a correlation between said HDTV signal and a first reference signal same as said first synchronous signal;
   (b) obtaining a second correlation value representing the correlation between said input HDTV signal and a second reference signal same as said second synchronous signal;
   (c) delaying said first correlation value by a predetermined number of symbols, and generating a first timing signal synchronized with said second synchronous signal having the inverting phase;
   (d) latching said second correlation value according to said first timing signal and generating a second timing signal synchronized with when said second synchronous signal is positive;
   (e) performing a logic operation on said first and second timing signals, to generate a third timing signal synchronized with when said second synchronous signal is negative; and
   (f) generating a field identification signal based upon said second and third timing signals.

16. The field identification signal generating method according to claim 15, wherein said step (a) comprises the step of obtaining a correlation value between a sign bit of a 511PN signal inserted into a field synchronous signal sequence of said HDTV signal, and a 511PN reference signal.

17. The field identification signal generating method according to claim 15, wherein said step (b) comprises the steps of:
   (b1) determining a correlation value representing a correlation between a sign bit of a 63PN signal inserted into a field synchronous signal sequence of said HDTV signal, and a 63PN reference signal, to obtain the second correlation value; and
   (b2) selecting only a sign bit of said correlation value obtained in said step (b1), to output said second correlation value.

18. A receiver to generate a field identification signal of a received high-definition (HD) signal, wherein said HD signal includes fields, a particular signal having a polarity alternately inverted in consecutive ones of the fields, and a first signal, the receiver comprising:
   a detector to detect the polarities of the particular signal in each field, said detector comprising
      a first detector to detect a first correlation value between the HD signal and a first reference signal of a same type as said first signal, and to generate a timing control signal, synchronized with said particular signal, when said first correlation value is at least as great as a predetermined value, and
      a second detector to detect a second correlation value representing a correlation between the HD signal and a second reference signal of a same type as the particular signal, and to generate information on polarities of the second correlation value; and
   a generator to generate the field identification signal based upon the polarities of the second correlation value and synchronized with said timing control signal.

19. The receiver as claimed in claim 18, wherein said field identification signal represents odd and even ones of the fields.

20. The receiver as claimed in claim 18, wherein said first detector comprises:
   a first correlator to determine the correlation between the HD signal and the first reference signal, to output the first correlation value; and
   a comparator to compare the first correlation value with a predetermined value, to output a comparison signal for generating the timing control signal, when the first correlation value is at least as great said predetermined value.

21. The receiver as claimed in claim 20, wherein said second detector comprises:
   a second correlator to determine the correlation between the HD signal and the second reference signal, to output the second correlation value; and
   a sign bit selector to select only a sign bit of the second correlation value;
   wherein said generator generates the field identification signal based upon the sign bit.

22. The receiver as claimed in claim 18, wherein said second detector comprises:
   a second correlator to determine the correlation between the HD signal and the second reference signal, to output the second correlation value; and
   a sign bit selector to select only a sign bit of the second correlation value;
   wherein said generator generates the field identification signal based upon the sign bit.

23. A receiver to generate a field identification signal of a received high-definition (HD) signal, wherein said HD signal includes fields and a particular signal having a polarity alternately inverted in consecutive ones of the fields, and said HD signal includes frames each having two of the fields, each field comprises a field synchronous segment and data segments, each field synchronous segment includes a first synchronous signal and the particular signal comprising three second synchronous signals, and a phase of one of said three second synchronous signals is inverted in consecutive fields, the receiver comprising:
   a detector to detect the polarities of the particular signal in each field, said detector comprising
      a first correlator to determine a first correlation value representing a correlation between the HD signal and a first reference signal of a same type as the first synchronous signal, and
      a second correlator to determine a second correlation value representing a correlation between the HD signal and a second reference signal of a same type as the second three second synchronous signals, and to output information on polarities of the second correlation value; and
   a generator to generate the field identification signal based upon the detected polarities of the second correlation value.

24. The receiver as claimed in claim 23, wherein said generator comprises:
   a first generator to generate a first timing signal synchronized with the one of the three second synchronous signals which has an inverting phase, by delaying said first correlation value by a predetermined number of symbols;
   a second generator to latch the second correlation value according to the first timing signal and generating a second timing signal synchronized with when the second synchronous signal having the inverting phase is one of positive and negative;
   a third generator to perform logical operations on the first and second timing signals to generate a third timing signal synchronized with when the one of the three second synchronous signals having the inverting phase is the other one of positive and negative; and
   a fourth generator to generate the field identification signal representing odd and even one of the fields, based on the second and third timing signals.

25. The receiver as claimed in claim 20, wherein said second detector comprises:
   a sign bit selector to select only a sign bit of the HD signal;
   a second correlator to determine the correlation between the output of said sign bit selector and the second reference signal, to output the second correlation value; and
   wherein said generator generates the field identification signal based upon the second correlation value.

26. The receiver as claimed in claim 21, wherein said sign bit selector selects a most significant bit of the second correlation value.

27. The receiver as claimed in claim 22, wherein said sign bit selector selects a most significant bit of the second correlation value.

28. A receiver to generate a field identification signal of a received high-definition (HD) signal, wherein said HD signal includes fields and a particular signal having a polarity alternately inverted in consecutive ones of the fields, and the HD signal includes frames each having two fields, each field comprises a field synchronous segment and data segments, each field synchronous segment includes a first synchronous signal and three second synchronous signals which form the particular signal, and a phase of one of the three second synchronous signals is inverted in consecutive fields, the receiver comprising:
   a detector to detect the polarities of the particular signal in each field, said detector comprising
      a first reference signal generator to generate a first reference signal of a same type as said first synchronous signal,
      a first correlator to obtain a first correlation value representing a correlation between said HD signal and said first reference signal,
      a second reference signal generator to generate a second reference signal of a same type as said three second synchronous signals,
      a second correlator to obtain a second correlation value representing a correlation between said HD signal and said second reference signal,
      a comparator to compare said first correlation value with a predetermined reference value, and to output a comparison signal based upon the comparison between said first correlation value and said predetermined reference value,
      a first latch to latch the comparison signal in accordance with a received symbol clock frequency, to generate a first latched signal,
      a symbol delay to delay said first latched signal by a predetermined number of symbols, and to output a first timing signal synchronized with said one of three second synchronous signals having the inverting phase,
      a sign bit selector to select only a sign bit from said second correlation value,
      a second latch to latch said sign bit according to said first timing signal, and to output a second timing signal synchronized with when said one of three second synchronous signals having the inverting phase has a first polarity, and
      a logic circuit to perform a logic operation on the second latched signal the first timing signal, and to generate a third timing signal which is synchronized with when said one of three second synchronous signals having the inverting phase has a second polarity opposite to the first polarity; and
   a generator to receive the second timing signal as a set signal, and the third timing signal as a reset signal, to generate the field identification signal.

29. The receiver as claimed in claim 28, wherein said first latched signal functions as a field synchronization signal.

30. The receiver as claimed in claim 28, wherein said logic circuit comprises:
   an inverter to invert the second timing signal; and
   an AND gate for performing an AND operation on the inverted second timing signal and the first timing signal, to generate the reset signal.

31. The receiver as claimed in claim 28, wherein said logic circuit comprises:
an exclusive or GATE to perform an exclusive or GATE operation on said first and second timing signals, to generate the reset signal.

32. The receiver as claimed in claim 28, wherein the first synchronous signal is a 511 pseudo number (PN) comprising 511 symbols, the first reference signal is a 511PN reference signal, the second synchronous signal is a 63 pseudo number (PN) comprising 63 symbols, and the second reference signal is a 63PN reference signal, the first correlator generates one correlation amplitude for each field and the second correlator generates three correlation amplitudes for each field, and said symbol delay delays the one correlation amplitude of said first correlator to coincide in time with a middle one of the three correlation values of said second correlator in each field.

33. A receiver to generate a field identification signal of a received high-definition (HD) signal, wherein said HD signal includes fields and a particular signal having a polarity alternately inverted in consecutive ones of the fields, and said HD signal includes frames each having two of the fields, each field comprises a field synchronous segment and data segments, each field synchronous segment includes a first synchronous signal and the particular signal comprising three second synchronous signals, and a phase of one of said three second synchronous signals is inverted in consecutive fields, the receiver comprising:
a detector to detect the polarities of the particular signal in each field, said detector comprising
a first correlator to determine a first correlation value representing a correlation between the HD signal and a first reference signal of a same type as the first synchronous signal, and
a second correlator to determine a second correlation value representing a correlation between the HD signal and a second reference signal of a same type as the second three second synchronous signals, and to output information on polarities of the second correlation value; and
a generator to generate the field identification signal based upon the detected polarities of the second correlation value;
wherein the first synchronous signal is a 511 pseudo number (PN) comprising 511 symbols, the first reference signal is a 511PN reference signal, the second synchronous signal is a 63 pseudo number (PN) comprising 63 symbols, and the second reference signal is a 63PN reference signal.

34. A receiver to generate a field identification signal of a received high-definition (HD) signal, wherein said HD signal includes fields and a particular signal having a polarity alternately inverted in consecutive ones of the fields, and said HD signal includes frames each having two of the fields, each field comprises a field synchronous segment and data segments, each field synchronous segment includes a first synchronous signal and the particular signal comprising three second synchronous signals, and a phase of one of said three second synchronous signals is inverted in consecutive fields, the receiver comprising:
a sign bit selector to select a sign bit of the HD signal;
a detector to detect the polarities of the particular signal in each field, wherein said detector comprises a first correlator to determine a first correlation value representing a correlation between the sign bit of the HD signal and a first reference signal of a same type as the first synchronous signal, and
a second correlator to determine a second correlation value representing a correlation between the sign bit of the HD signal and a second reference signal of a same type as the second three second synchronous signals, and to output information on polarities of the second correlation value; and
a generator to generate the field identification signal based upon the detected polarities of the second correlation value;
wherein the first synchronous signal is a 511 pseudo number (PN) comprising 511 symbols, the first reference signal is a 511PN reference signal, the second synchronous signal is a 63 pseudo number (PN) comprising 63 symbols, and the second reference signal is a 63PN reference signal.

35. The receiver as claimed in claim 20, further comprising:
a converter to convert the HD signal into vestigial side band data; and
an equalizer having a filter with coefficients, wherein said equalizer equalizes the coefficients for each field of the vestigial side band data based upon the field identification signal.

36. The receiver as claimed in claim 35, wherein said equalizer outputs data having an arbitrary level among eight levels, during the coefficients renewal, to perform tracking a moving ghost.

37. The receiver as claimed in claim 28, further comprising:
a converter to convert the HD signal into vestigial side band data; and
an equalizer having a filter with coefficients, wherein said equalizer equalizes the coefficients for each field of the vestigial side band data based upon the field identification signal.

38. The receiver as claimed in claim 35, further comprising:
a phase tracking loop to remove a phase noise of the equalized signal from said equalizer, to generate a phase noiseless signal; and
a channel decoder to trellis decode the phase noiseless signal, to generate a decoding signal, de-interleaves the decoded signal based upon the field identification signal, and de-randomizes the de-interleaved signal based upon the field identification signal.

39. The receiver as claimed in claim 37, further comprising:
a phase tracking loop to remove a phase noise of the equalized signal from said equalizer, to generate a phase noiseless signal; and
a channel decoder to trellis decode the phase noiseless signal, to generate a decoding signal, de-interleaves the decoded signal based upon the field identification signal, and de-randomizes the de-interleaved signal based upon the field identification signal.

40. A receiver to generate a field identification signal of a received high-definition (HD) signal, wherein said HD signal includes fields and a particular signal having a polarity alternately inverted in consecutive ones of the fields, the receiver comprising:

a detector to detect the polarities of the particular signal in each field; and a generator to generate the field identification signal based upon the detected polarities of the particular signal;

a tuner to generate an intermediate frequency (IF) signal from the HD signal;

an IF amplifier to control an amplitude of the IF signal;

an A/D converter to convert the amplitude controlled IF signal to a digital signal according to a clock signal;

a digital frequency a phase locked loop (DFPLL) circuit to restore a carrier wave using a pilot signal included in the digital signal, to generate a demodulated base band signal;

a matched filter to remove signal distortion and aliasing by matching the demodulated base band signal to an original status of the HD signal prior to transmission, and control a symbol rate of the demodulated base band signal, according to a symbol clock, to generate a vestigial side band signal;

a symbol clock restorer to restore the symbol clock based upon the vestigial side band signal and a segment synchronous signal, and to generate the clock signal to have twice a frequency of the symbol clock frequency;

a segment synchronous signal detector to receive the vestigial side band signal from said matched filter, and to generate the segment synchronous signal from the vestigial side band signal;

wherein said detector detects the polarities of the particular signal in each field in the vestigial side band signal.

41. The receiver as claimed in claim 40, wherein said segment synchronous signal detector determines a correlation value of the vestigial side band signal in a unit of four symbols, accumulates the correlation value in a segment unit, and generates the segment synchronous signal at a position where an accumulated value of maximum correlation is detected in each of data segments of the vestigial side band signal.

42. The receiver as claimed in claim 18, further comprising:

a tuner to generate an intermediate frequency (IF) signal from the HD signal;

an IF amplifier to control an amplitude of the IF signal;

an A/D converter to convert the amplitude controlled IF signal to a digital signal according to a clock signal;

a digital frequency a phase locked loop (DFPLL) circuit to restore a carrier wave using a pilot signal included in the digital signal, to generate a demodulated base band signal;

a matched filter to remove signal distortion and aliasing by matching the demodulated base band signal to an original status of the HD signal prior to transmission, and control a symbol rate of the demodulated base band signal, according to a symbol clock, to generate a vestigial side band signal;

a symbol clock restorer to restore the symbol clock based upon the vestigial side band signal and a segment synchronous signal, and to generate the clock signal to have twice a frequency of the symbol clock frequency;

a segment synchronous signal detector to receive the vestigial side band signal from said matched filter, and to generate the segment synchronous signal from the vestigial side band signal;

wherein said first detector detects the first correlation value using the vestigial side band signal and the first reference signal and the second detector detects the second correlation value using the vestigial side band signal and the second reference signal.

43. The receiver as claimed in claim 28, further comprising:

a tuner to generate an intermediate frequency (IF) signal from the HD signal;

an IF amplifier to control an amplitude of the IF signal;

an A/D converter to convert the amplitude controlled IF signal to a digital signal according to a clock signal;

a digital frequency a phase locked loop (DFPLL) circuit to restore a carrier wave using a pilot signal included in the digital signal, to generate a demodulated base band signal;

a matched filter to remove signal distortion and aliasing by matching the demodulated base band signal to an original status of the HD signal prior to transmission, and control a symbol rate of the demodulated base band signal, according to the symbol clock, to generate a vestigial side band signal;

a symbol clock restorer to restore the symbol clock based upon the vestigial side band signal and a segment synchronous signal, and to generate the clock signal to have twice a frequency of the symbol clock frequency;

a segment synchronous signal detector to receive the vestigial side band signal from said matched filter, and to generate the segment synchronous signal from the vestigial side band signal;

wherein said first detector detects the first correlation value using the vestigial side band signal and the first reference signal and the second detector detects the second correlation value using the vestigial side band signal and the second reference signal.

44. A receiver to generate a field identification signal of a received high-definition (HD) signal, wherein said HD signal includes frames each having two of the fields, each field comprises a field synchronous segment and data segments, each field synchronous segment includes a first synchronous signal and three second synchronous signals, and a phase of one of said three second synchronous signals is inverted in consecutive fields, the receiver comprising:

a detector to detect the polarity of a middle one of the three second synchronous signals in each field; and a generator to generate the field identification signal based upon the detected polarities of the middle one of the three second synchronous signals.

45. A receiver to generate a field identification signal of a received high-definition (HD) signal, wherein said HD signal includes frames each having two of the fields, each field comprises a field synchronous segment and data segments, each field synchronous segment includes a first synchronous signal and three second synchronous signals, and a phase of one of said three second synchronous signals is inverted in consecutive fields, the receiver comprising:

a field synchronous signal generator to generate a field synchronous signal based upon the HD signal; and a generator to generate the field identification a detector to detect the polarity of a middle one of the three second synchronous signals in each field; and a generator to generate the field identification signal based upon the detected polarities of the middle one of the three second synchronous signals.

46. A method of generating a field identification signal of a received high-definition (HD) signal, wherein said HD signal includes frames each having two of the fields, each field comprises a field synchronous segment and data segments, each field synchronous segment includes a first synchronous signal and three second synchronous signals, and a phase of one of said three second synchronous signals is inverted in consecutive fields, the receiver comprising:

determining the polarity of a middle one of the three second synchronous signals in each field; and generating the field identification signal based upon the detected polarities of the middle one of the three second synchronous signals.

* * * * *